(12) United States Patent
Haefliger et al.

(10) Patent No.: US 8,826,746 B2
(45) Date of Patent: Sep. 9, 2014

(54) FLOWMETER COMPRISING A DAMPING DEVICE

(75) Inventors: Mario Haefliger, Sarmenstorf (CH); Natale Barletta, Zurich (CH)

(73) Assignee: Levitronix GmbH, Zurich (CH)

( * ) Notice: Subject to any disclaimer, the term of this patent is extended or adjusted under 35 U.S.C. 154(b) by 163 days.

(21) Appl. No.: 13/304,245

(22) Filed: Nov. 23, 2011

(65) Prior Publication Data

US 2012/0137788 A1 Jun. 7, 2012

(30) Foreign Application Priority Data

Dec. 3, 2010 (EP) ..................................... 10193577

(51) Int. Cl.
*G01F 1/84* (2006.01)
*G01F 1/42* (2006.01)

(52) U.S. Cl.
USPC ................... 73/861.357; 73/861.355; 138/44; 138/40

(58) Field of Classification Search
USPC ................... 73/861.357, 861.355; 138/44, 40
See application file for complete search history.

(56) References Cited

U.S. PATENT DOCUMENTS

| 4,590,796 A | 5/1986 | Baatz | |
| 5,515,733 A * | 5/1996 | Lynnworth | ................ 73/861.27 |
| 6,171,078 B1 * | 1/2001 | Schob | ......................... 417/423.1 |
| 6,336,370 B1 * | 1/2002 | van der Pol | .............. 73/861.357 |
| 6,360,614 B1 * | 3/2002 | Drahm et al. | ........... 73/861.357 |
| 2006/0021449 A1 * | 2/2006 | Hussain et al. | .......... 73/861.357 |
| 2006/0123924 A1 * | 6/2006 | Rolph et al. | .............. 73/861.357 |

FOREIGN PATENT DOCUMENTS

| DE | 100 15 051 A1 | 9/2001 | |
| EP | 1 510 437 A1 | 3/2005 | |
| EP | 1 715 238 A2 | 10/2006 | |
| GB | 2 303 925 A | 3/1997 | |
| WO | WO 2009/152321 A1 | 12/2009 | |
| WO | WO2009152321 | * 12/2009 | ............. G01N 21/00 |

* cited by examiner

Primary Examiner — Lisa Caputo
Assistant Examiner — Philip Cotey
(74) Attorney, Agent, or Firm — Kilpatrick Townsend & Stockton LLP

(57) ABSTRACT

A flowmeter having an inlet through which the medium can flow into a measurement zone and having an outlet through which the medium can flow out, wherein a damping device is provided in front of the inlet, and has a first mass which can be flowed through having a first inlet and a first outlet for the medium, a second mass which can be flowed through having a second inlet and a second outlet for the medium as well as a flow connection which is capable of vibration and which connects the first outlet to the second inlet, wherein a minimal flow cross-section (d) of the flow connection is smaller than the inlet cross-section (E) at the first inlet or smaller than the outlet cross-section (A) at the second outlet.

16 Claims, 2 Drawing Sheets

FLOWMETER COMPRISING A DAMPING DEVICE

CROSS-REFERENCE TO RELATED APPLICATION

Figure 1:
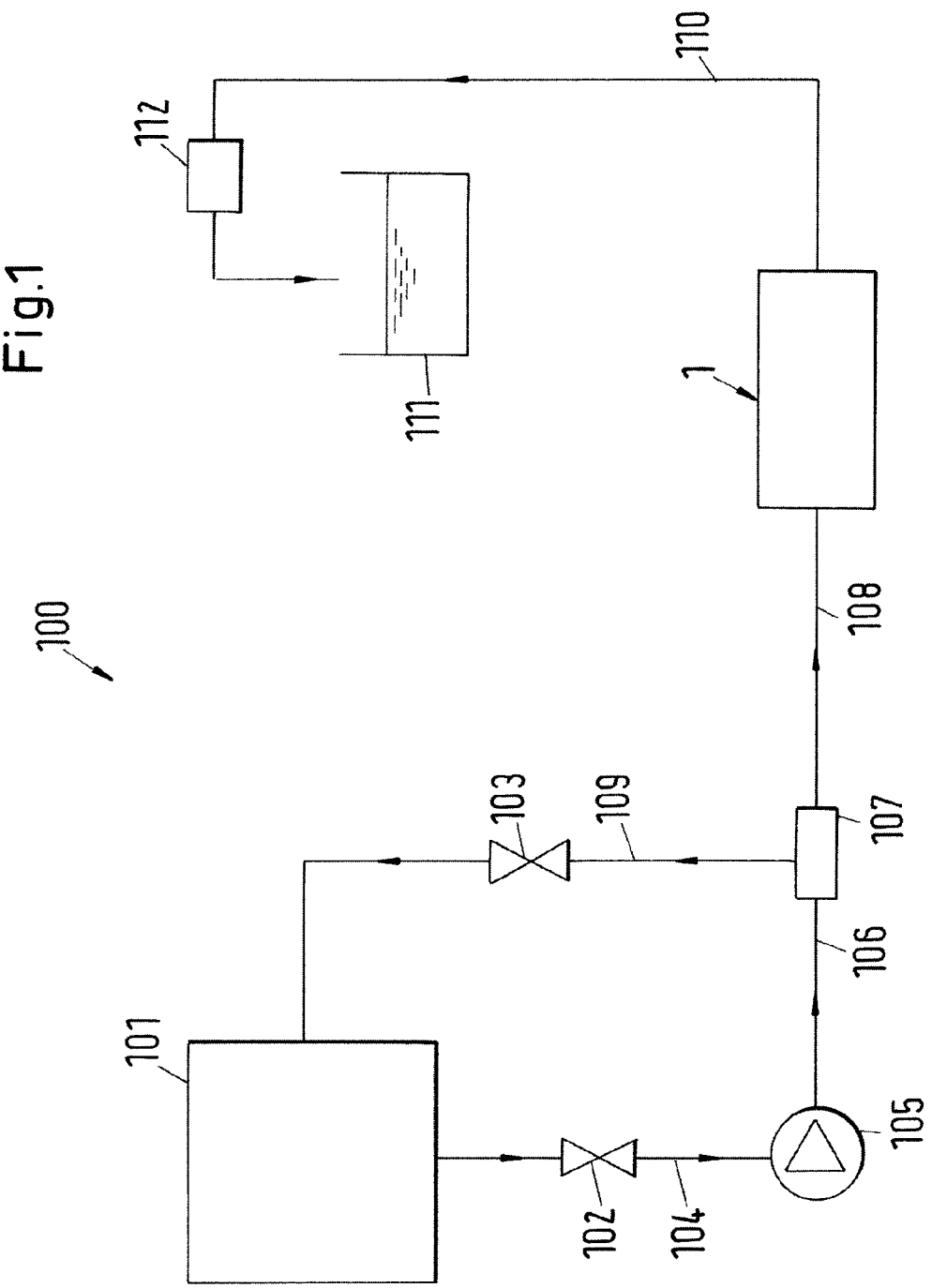

This application claims the priority of European Patent Application No. 10 193 577.3, filed on Dec. 3, 2010, the disclosure of which is incorporated herein by reference.

The invention relates to a flowmeter for determining the flow of a fluid medium in accordance with the preamble of the independent apparatus claim. The invention further relates to the use of such a flowmeter.

Flowmeters are used in many fluid systems to determine or to regulate the quantity of a fluid which is delivered to a process or into a container or is removed therefrom. Such flowmeters are frequently based on an ultrasonic measurement signal or on the Coriolis principle.

A pump for conveying the fluid is typically provided in such a fluid system. The medium to be conveyed in this respect moves, for example, from a tank into a pump and is subsequently divided at a branch into a main flow and into a bypass flow. The bypass flow serves the purpose, for example, that the medium does not heat up in an unpermitted manner at a low main flow rate or to circulate the medium located in the tank so that no deposits or other unwanted effects take place. The main flow flows through a flowmeter and is then supplied to the process or to the container. The division into main flow and bypass flow takes place as a rule via a valve which is then controlled or regulated with the aid of the signal determined by the flowmeter. It is customary to arrange the flowmeter as close as possible to the pump, e.g. for space reasons or to have as little of the medium as possible in the fluid system.

Centrifugal pumps are frequently used as pumps, for example such pumps as are marketed by the applicant and which are based on a bearingless motor with disk-shaped impellers. As a result of their operating principle, centrifugal pumps generate vibrations which can influence the quality of the signal of the flowmeter, even significantly. In this respect, it is, on the one hand, a question of vibrations which spread out or propagate as mechanical vibrations over the lines of the fluid system and, on the other hand of pressure fluctuations which are generated in the fluid.

These vibration influences on the flowmeter are known and measures are also known for damping such vibrations. There are, for example, special vibration damping hoses or spirally extending hoses or also pressure compensation vessels which are connected upstream of the flowmeter.

There are, however, some processes, for example in semiconductor technology, which make very high demands on the clearance volume, on the compact construction shape or on a particularly simple prefilling of the system (priming) and for which the known measures do not represent a satisfactory solution.

Starting from this prior art it, it is therefore an object of the invention to propose a throughflow meter in which both the vibrations on the line system and the pressure fluctuations or disturbances in the fluid have a much smaller influence on the quality of the measurement signal. The flowmeter should in particular be suitable for such fluid systems in which a centrifugal pump is provided.

The flowmeter satisfying this object is characterized by the features of the independent claims of the apparatus category.

In accordance with the invention, a flowmeter is therefore proposed for determining the flow of a fluid medium having an inlet through which the medium can flow into a measurement zone and having an outlet through which the medium can flow out. A damping device which can be flowed through by the medium is provided in front of the inlet and has a first mass which can be flowed through having a first inlet and a first outlet for the medium, a second mass which can be flowed through having a second inlet and a second outlet for the medium and also a flow connection capable of vibration which connects the first outlet to the second inlet, wherein a minimal flow cross-section of the flow connection is smaller than the inlet cross-section at the first inlet or smaller than the outlet cross-section at the second outlet.

The quality of the sensor signal can be considerably improved by this damping device. The first and the second masses, with the flow connection capable of vibration arranged therebetween, form a system capable of vibration which operates as a connected system in the operating state, that is the system capable of vibration has an eigenfrequency which is much lower than the frequencies of the vibrations which are transmitted via the line system and which are produced by the pump. The system capable of vibration can thus not follow the vibrations so that they are at least substantially damped by the damping device. In addition, the pressure fluctuations in the fluid flow can be greatly damped by the reduction in the flow cross-section between the first inlet and the second outlet, that is the fluid flow is calmed. The friction is increased by the reduction in the flow cross-section, whereby the energy of the pressure fluctuations is converted into friction. Both disturbance sources for the measurement signal, namely the vibrations on the line system and the disturbances in the fluid flow, can therefore be at least considerably damped by this damping device.

It has proved itself in practice if the minimal flow cross-section of the flow connection is at least four times, preferably at least nine times, and in particular at least sixteen times smaller than the inlet cross-section at the first inlet or than the outlet cross-section at the second outlet. The ideal reduction in the flow cross-section can be adapted in dependence on the application. As a rule, it is the case that the ratio of the minimal flow cross-section to the inlet cross-section or outlet cross-section is selected the smaller, the smaller the flow, i.e. the flow rate, of the medium.

In a preferred embodiment, the flow connection is designed as a substantially cylindrical passage which extends in a longitudinal direction. This embodiment is simple in construction and avoids unwanted clearance volumes.

An advantageous measure is to arrange the flow connection in a mass block which extends in the longitudinal direction between the first mass and the second mass. This mass block has proved favorable for the vibration damping.

The mass block preferably has at least one transition at which the extent of the mass block changes in a direction perpendicular to the longitudinal direction. This can be grooves or corrugations, for example, which run around the mass block in the peripheral direction. The wall thickness of the mass block between regions with thinner walls and regions with thicker walls thereby changes. The transitions between the regions of different wall thickness effect an additional damping of the vibrations.

This effect is particularly pronounced when the extent of the mass block changes abruptly in the direction perpendicular to the longitudinal direction.

It is therefore particularly preferred if the mass block has at least one rib which extends along the total periphery of the mass block in the direction perpendicular to the longitudinal direction.

It has proved favorable from a technical material aspect if the flow connection or the mass block is manufactured from a thermoplastic.

In a preferred embodiment, the flowmeter includes an ultrasonic sensor.

In another preferred embodiment, the flowmeter includes a Coriolis sensor.

A preferred use of the flowmeter in accordance with the invention is the use in a fluid system in which a centrifugal pump is provided.

The flowmeter in accordance with the invention is especially suitable in a fluid system in which a centrifugal pump is provided which is based on a bearingless motor having a disk-shaped rotor.

Further advantageous measures and embodiments of the invention result from the dependent claims.

Figure 2:
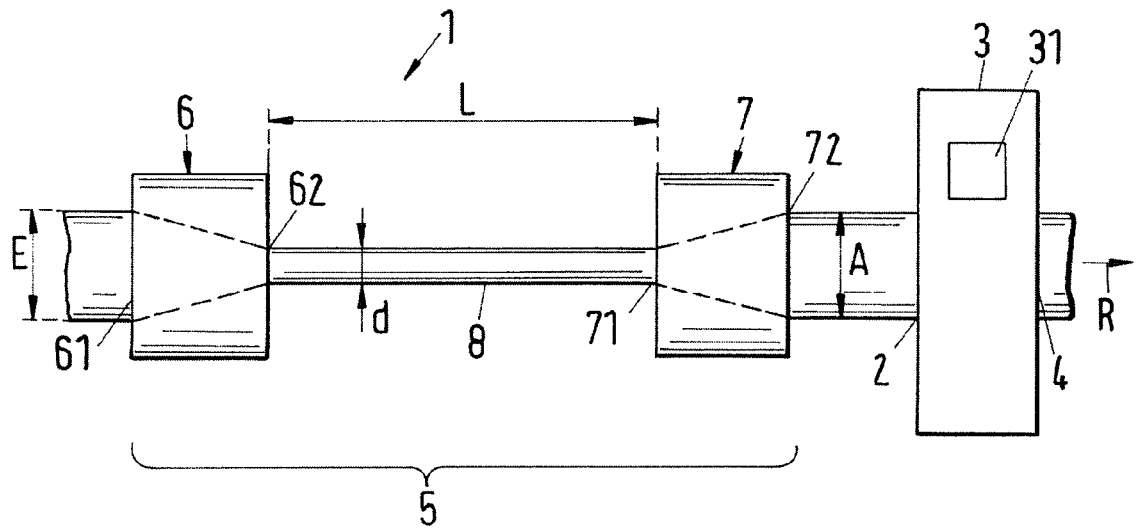
Figure 3:
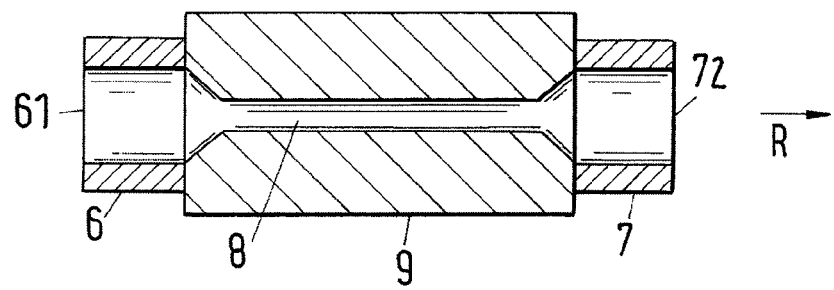
Figure 4:
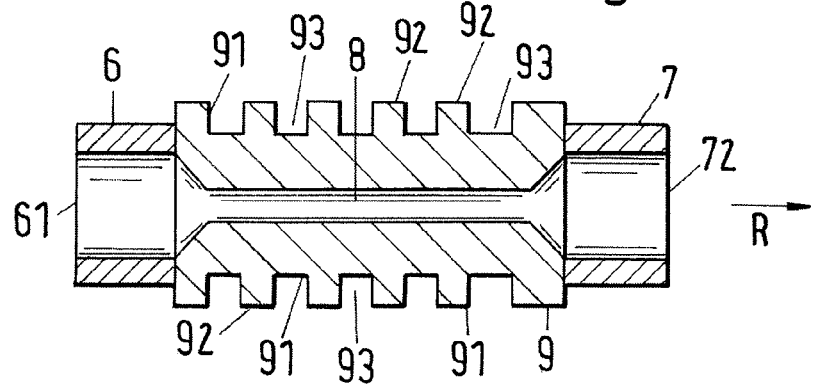

The invention will be explained in more detail in the following with reference to embodiments and to the drawing. There are shown in the schematic drawing, partly in section:

FIG. 1: a schematic representation of a fluid system having a flow sensor;

FIG. 2: a schematic representation of an embodiment of a flowmeter in accordance with the invention;

FIG. 3: a schematic sectional representation of a first variant for the damping device; and FIG. 4: a schematic sectional representation of a second variant for the damping device.

FIG. 1 shows, in a schematic representation, a fluid system which is provided overall with the reference numeral 100. The fluid system 100 includes a storage container 101 for a fluid medium, for example a photoresist for the coating of semiconductors. The storage container 101 is connected via a feed line 104 to a pump 105 which conveys the fluid medium and which is preferably designed as a centrifugal pump. A first valve 102 is provided in the feed line 104 to open or to close the flow connection between the storage container 101 and the pump 105. A line 106 which leads to a branch apparatus 107 where the fluid is divided into a main flow and into a bypass flow adjoins the outlet of the pump 105. The bypass fluid moves via a bypass line 109, in which a second valve 103 is provided, back into the storage container 101.

The main flow moves via a further line 108 to a flowmeter 1 with which the flow rate of the fluid medium is determined. The fluid medium moves from the flowmeter 1 via a feed line 110 to a process 111 or to a container 111 to which is should be supplied. Optionally, a dispensing device 112 can also be provided in or at the feed line 110 and supplies the medium to the process 111 or to the container 111.

The division of the flow into the main flow and the bypass flow by the branch apparatus 107 can be regulated or controlled, for example, with the aid of the flow rate determined by the flowmeter 1. For this purpose, the branch apparatus can, for example, include a regulable three-way valve.

The pump 105 is preferably designed as a centrifugal pump and particularly preferably as a centrifugal pump which is based on a bearingless motor having a disk-shaped rotor, in particular a permanently magnetic rotor. Such a bearingless motor or a centrifugal pump based thereon is disclosed, for example, in EP-A-0 860 046 and also in EP-A-0 819 330 and therefore does not need any more detailed explanation here.

The flowmeter 1 is designed as a flowmeter 1 in accordance with the invention. FIG. 1 shows, in a schematic representation, an embodiment of the flowmeter 1 in accordance with the invention.

The flowmeter 1 for determining the flow of a fluid medium, for example of a liquid, includes an inlet 2 through which the medium can flow into a measurement zone 3 as well as an outlet 4 through which the fluid can flow out of the measurement zone 3. In this measurement zone 3, a sensor 31 is provided with whose measurement signal the flow or the flow rate of the fluid medium can be determined.

The sensor 31 is preferably an ultrasonic sensor or a Coriolis sensor. Such sensors are per se prior art and do not therefore require any further explanation. In particular such ultrasonic sensors are suitable as ultrasonic sensors which are marketed by the company Levitronix under the trade name LEVIFLOW:

A damping device 5 is provided upstream of the input 2 and both damps vibrations which spread out or propagate on the lines 106, 108 and calms the flow of the medium in the lines 106, 108. The first-named vibrations have their origin, inter alia, in the centrifugal pump 105 which produces vibrations as a result of its operating principle which can propagate via the lines 106, 108 and can substantially influence the measurement signal of the sensor 31. Pressure fluctuations, for example also caused by the pump 105, can occur in the fluid itself or other inhomogeneities such as vertebration due to turbulent flows can occur. Both disturbance effects, that is the vibrations and also the fluctuations in the fluid medium, are at least greatly damped by the damping device 5. The damping device 5 is preferably arranged directly or in front of or at least as close as possible to the inlet 2 into the measurement zone 3.

The damping device 5 can be flowed through by the medium and includes a first mass 6 having a first inlet 61 for the medium and a first outlet 62 as well as a second mass 7 having a second inlet 71 and a second outlet 72 for the medium. A flow connection 8 capable of vibration is furthermore provided which connects the first outlet 62 to the second inlet 71. This flow connection 8 has a minimal flow cross-section which is smaller than the inlet cross-section E at the first inlet 61 or smaller than the outlet cross-section A at the second outlet 72. The minimal flow cross-section d is preferably smaller than the inlet cross-section E at the first inlet 61 and smaller than the outlet cross-section A at the second outlet 72.

In this respect, the term "cross-section" in each case means an area, namely that area which is available for the fluid throughflow at the corresponding point. The minimal flow cross-section d is thus, for example, identical to the smallest area perpendicular to the direction of flow in the flow connection 8.

In the embodiment shown in FIG. 2, the flow connection 8 capable of vibration is designed as a cylindrical tube or as a substantially cylindrical passage which extends in a longitudinal direction R which coincides with the direction of flow of the fluid and which connects the first outlet 62 to the second inlet 71. In this case, the minimal cross-section d of the flow connection is the circular surface of the cylindrical tube. Within the first mass 6, the flow cross-section from the inlet cross-section E reduces to the cross-section d of the flow connection 8 and within the second mass 7, the flow cross-section increases from d to the outlet cross-section A.

Depending on the application, the minimal cross-section of the flow connection can be very small in comparison with the inlet cross-section E or with the outlet cross-section A. It has proved itself in practice if the minimal flow cross-section d of the flow connection 8 is at least four times, preferably at least nine times, and for some applications at least sixteen times smaller than the inlet cross-section E at the first inlet 61 or than the outlet cross-section A at the second outlet 72. With circular cross-sections, this means that the ratio of the diameter of the flow connection 8 to the diameter of the first inlet 61 or of the second outlet 62 amounts to at most ½, preferably at most ⅓, and especially at most ¼. The ideal ratio of the minimal flow cross-section d of the flow connection 8 to the main flow or the inlet cross-section or outlet cross-section E; A naturally depends on the respective application and can be matched thereto. It is the case as a rule that this ratio is to be selected the smaller, the smaller the flow rate is. With very small flow rates of, for example, less than 100 ml per minute, the flow connection 8 can indeed be formed as a capillary in comparison with the other lines and can have a diameter of less than 2 mm, for example 0.5 to 1.8 mm. The correction dimension also depends on the kind of the fluid, for example on its viscosity. A further parameter which can in particular be adapted for the optimization of the flow calming is the length L of the flow connection 8.

The first mass and the second mass 6 and 7 respectively, together with the flow connection 8, form a system capable of vibration. In this respect, the two masses 6, 7 represent large masses with high stiffness in comparison with the flow connection 8, whereas the flow connection 8 represents a small mass with very small stiffness in comparison therewith. In a mechanical analog, the two large masses 6, 7 are coupled to one another via the flow connection 8 acting as a spring. This system has an eigenfrequency or a cut-off frequency which depends on the masses 6, 7 and on the stiffness of the flow connection 8. The stiffness of the flow connection is therefore quasi the spring constant. The cut-off frequency of the system capable of vibration formed from the first and second masses 6, 7 and from the flow connection 8 can thus be set by a matching of the masses 6, 7 and of the stiffnesses. The cut-off frequency is now set so that it is small in comparison with the frequencies of the vibrations which are produced by the pump 105 or which spread out and propagate via the lines 106, 108. The system capable of vibration formed from the two masses 6, 7 and from the flow connection 8 behaves like a connected system in the operating state by this measure, that is a system which is excited by frequencies which are much larger than the cut-off frequency or the eigenfrequency of the system. This has the consequence that vibrations can be transferred via this system capable of vibration only with very large damping, if at all, so that the vibrations can no longer reach the inlet 2 of the measurement zone 3, or only with very high damping. The damping device 5 thus forms a low pass filter for the vibrations whose cut-off frequencies is smaller than the vibrations which typically occur in the system and propagate via the lines.

Depending on the application, it is not absolutely necessary in this respect that the first and the second mass 6, 7 are discrete, additionally present masses. It is indeed possible that the first and the second masses 6, 7 are realized, for example, by the mass of the lines.

The calming of the flow within the lines is in particular based on the reduced flow cross-section in the flow connection 8. Inhomogeneities or disturbances in the flow are hereby converted into friction energy, which results in a considerable flow calming.

Both vibrations are damped which spread out over or via the lines of the fluid system 100 and inhomogeneities or disturbances in the flowing medium are therefore damped by the damping device 5 of the flowmeter 1 in accordance with the invention. Both disturbance influences are thus at least considerably reduced in front of the measurement zone 3, which considerably increases the measurement accuracy. This in particular applies in the range of small flow rates of, for example, less than 100 ml/min where such disturbances would have a particularly negative effect on the measurement result.

A significant flow calming can be realized by the use of the flow connection 8, for example a capillary, matched to the respective application. This has the advantage that the filter time constants for flow calming by way of software can be selected as very small, which in turn brings about the positive effect of high flow regulation dynamics.

Since a considerable vibration damping can also be realized, in addition to the flow calming, the flowmeter 1 in accordance with the invention is characterized by a very high accuracy with high dynamics.

As already mentioned, the flow cross-section does not have to be constant in the flow connection 8, i.e. the flow connection can also differ from the shape of a cylindrical passage or tube. Very many geometrical embodiments are possible here. For example, the flow connection 8 can first taper and then flare again with respect to its flow cross-section; it can also taper continuously down to the minimal flow cross-section d and then remain constant. The flow cross-section within the flow connection 8 can also differ from a circular area and be elliptical or rectangular, for example. The change in the flow cross-section can be realized continuously, constantly or abruptly. This is mentioned to describe only some possible variants.

The flow connection 8 is preferably manufactured from a plastic and in particular from a thermoplastic. The following plastics are named with exemplary character here: PP, PTFE, PVDF, PFA, PE, ECTFE, ETFE.

A particularly advantageous measure is to arrange the flow connection 8 in a mass block 9 which extends in the longitudinal direction R between the first mass 6 and the second mass 7. Such a first variant is illustrated in FIG. 3 in a sectional representation. It has been found that the vibrations can in particular be reduced by the mass block 9 It is also possible in this variant that the first and the second masses 6, 7 are not provided as separate components, but are rather realized, for example, by the lines 108, etc. The mass block 9 is preferably also produced from a plastic, in particular from a thermoplastic of which examples are named further above. The flow connection 8 can either be inserted into the mass block 9 as a separate tube or it is realized by a corresponding bore in the mass block 9. The mass block 9 can be designed perpendicular to the longitudinal direction R, for example, with a circular, oval or rectangular cross-section.

In FIG. 4, a second variant for the damping device 5 is shown in a schematic sectional representation. The mass block 9 is also provided here. The explanations on the first variant also apply in accordingly the same manner to the second variant. In the second variant, the mass block 9 has at least one transition 91 at which the extent of the mass block 9 changes in a direction perpendicular to the longitudinal direction R. It has namely been found that the vibrations can be very greatly damped by such transitions 91. It is particularly favorable for this when the extent of the mass block 9 changes abruptly in the direction perpendicular to the longitudinal direction R at the transition 91.

As FIG. 4 shows, a plurality of such transitions 91 are preferably provided. The mass block 9 in accordance with the variant in FIG. 4 specifically has at least one rib, here a plurality of ribs 92, which each extend along the total periphery of the mass block 9 in the direction perpendicular to the longitudinal direction R. The ribs 92 are separated from one another by peripheral grooves 93. Each change from a groove 93 to a rib 92 represents a transition 91 which has a positive effect on the damping of the vibrations. The number of the ribs 92 or of the peripheral grooves 93 depends on the application and can be optimized in a simple manner. It is also possible in this second variant that the first and the second masses 6, 7 are not provided as separate components, but are rather realized, for example, by the lines 9 or by parts of the mass block 9.

The flowmeter 1 in accordance with the invention is in particular suitable for such fluid systems 100 in which the pump 105 is a centrifugal pump and especially a centrifugal pump which is based on a bearingless motor having a disk-shaped rotor, preferably a permanently magnetic rotor.

The flowmeter in accordance with the invention is in particular also suitable for applications in the manufacture and processing of semiconductors and semiconductor structures as well as for applications in which very compact embodiments or clearance volumes which are as small as possible or a simple prefilling of the system (priming) are important.

The invention claimed is:

1. A flowmeter for measuring the flow rate of a fluid medium, comprising:
    a measurement zone;
    an inlet, configured for the medium to flow through the inlet and into the measurement zone;
    an outlet, configured for the medium to flow out of the flowmeter through the outlet; and
    a damping device, configured for the medium to flow therethrough, wherein the damping device is disposed upstream of the inlet, and wherein the damping device comprises:
        a first mass, configured for the medium to flow therethrough, the first mass comprising a first inlet and a first outlet for the medium,
        a second mass, configured for the medium to flow therethrough, the second mass comprising a second inlet and a second outlet for the medium; and
        a flow connection, which connects the first outlet to the second inlet, wherein a minimal flow cross-section of the flow connection is smaller than the inlet cross-section at the first inlet or smaller than the outlet cross-section at the second outlet.

2. The flowmeter in accordance with claim 1, wherein the minimal flow cross-section of the flow connection is at least four times smaller than the inlet cross-section at the first inlet or than the outlet cross-section at the second outlet.

3. The flowmeter in accordance with claim 1, wherein the flow connection is a substantially cylindrical passage which extends in a longitudinal direction.

4. The flowmeter in accordance with claim 1, further comprising a block which extends between the first and the second masses in a longitudinal direction, wherein the flow connection is disposed in the block.

5. The flowmeter in accordance with claim 4, wherein the block comprises at least one transition at which an extent of the block changes in a direction perpendicular to the longitudinal direction.

6. The flowmeter in accordance with claim 5, wherein the extent of the block changes abruptly in the direction perpendicular to the longitudinal direction.

7. The flowmeter in accordance with claim 4, wherein the block comprises at least one rib which extends along a total periphery of the block in the direction perpendicular to the longitudinal direction.

8. The flowmeter in accordance with claim 1, wherein the flow connection comprises a thermoplastic.

9. The flowmeter in accordance with claim 1, further comprising a sensor disposed in the measurement zone, configured to measure the flow rate of the medium.

10. The flowmeter in accordance with claim 9, wherein the sensor is an ultrasonic sensor.

11. The flowmeter in accordance with claim 9, wherein the sensor is a Coriolis sensor.

12. The flowmeter in accordance with claim 1 in combination with a centrifugal pump, wherein the centrifugal pump is disposed upstream of and in fluid communication with the flowmeter.

13. The flowmeter in accordance with claim 1 in combination with a centrifugal pump, the centrifugal pump comprising a bearingless motor comprising a disk-shaped rotor, wherein the centrifugal pump is disposed upstream of and in fluid communication with the flowmeter.

14. The flowmeter in accordance with claim 1, wherein the damping device is configured to damp vibrations of the medium.

15. The flowmeter in accordance with claim 1, wherein the minimal flow cross-section of the flow connection is at least nine times smaller than the inlet cross-section at the first inlet or than the outlet cross-section at the second outlet.

16. The flowmeter in accordance with claim 1, wherein the minimal flow cross-section of the flow connection is at least sixteen times smaller than the inlet cross-section at the first inlet or than the outlet cross-section at the second outlet.

* * * * *